Feb. 16, 1960   E. JELLINEK   2,925,539
ELECTRICAL GAS TUBE CONTROL CIRCUITS WITH RESET
Filed May 28, 1956

INVENTOR
ERNEST JELLINEK
BY Jean C. Chognard
ATTORNEY

United States Patent Office 2,925,539
Patented Feb. 16, 1960

2,925,539

ELECTRICAL GAS TUBE CONTROL CIRCUITS WITH RESET

Ernest Jellinek, Marblehead, Mass., assignor to Electronics Corporation of America, Cambridge, Mass., a corporation of Massachusetts Application May 28, 1956, Serial No. 587,662

1 Claim. (Cl. 317—149)

This invention relates to electrical control circuits of the type which are responsive to a detected change in capacitance.

The principal object of this invention is to provide a simple, economical and rugged control which automatically resets itself when the detected condition is removed, and which provides a high amount of current through its load while the detected condition is present.

Other and incidental objects of this invention will be apparent to those skilled in the art from a reading of this specification and an inspection of the accompanying drawing in which.

Figure 1:
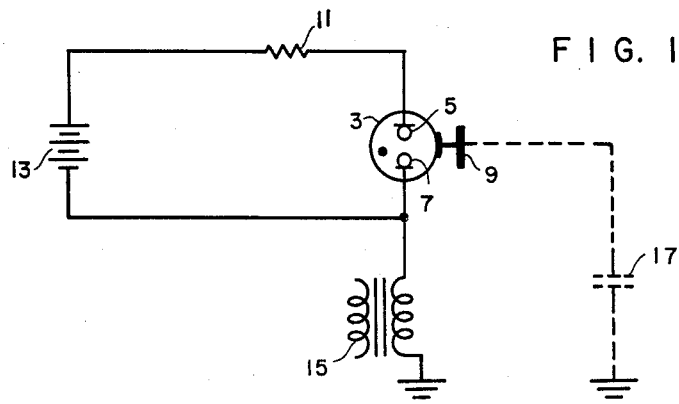
Figure 1 is a schematic diagram of a control circuit of the prior art.

Referring now to Figure 1, there is shown a circuit similar to that shown in Figure 3 of U.S. Patent No. 2,525,768, issued October 17, 1950, to William Henry Bruns. This circuit comprises a gas tube 3 having two internal electrodes, namely an anode 5 and a cathode 7. Tube 3 also comprises an external sensing electrode 9 on the outside surface of the tube 3. The sensing electrode 9 may be either a metal coating or a separate metal shield having capacitance to either or both the inner electrodes 5 and 7. Load 11, which may be a relay, is connected in series with the tube 3 and across an ungrounded direct-current source shown as battery 13. The voltage across battery 13 is less than the voltage required to break down the gas between the internal electrodes 5 and 7 of the tube 3 and greater than that required to sustain ionization between the internal electrodes 5 and 7 of tube 3 after ionization has started. A source of alternating current, shown as transformer 15, is connected between the cathode 7 of tube 3 and ground.

The operation of the circuit of Figure 1 is as follows: there is a capacitance 17 (shown in dotted lines in the drawing) between the sensing electrode 9 and ground. The value of this capacitance 17 depends on the spacing between as well as on the dielectric constant of the material between the sensing electrode 9 and ground. When this material is air, the capacitance 17 between the sensing electrode 9 and ground is very low and there is, therefore, no appreciable flow of alternating current between electrodes 7 and 9 of the tube 3. However, if the capacitance 17 between the sensing electrode 9 and ground is increased sufficiently, enough alternating current will flow between electrodes 7 and 9 of the tube 3 to cause ionization of the gas. Tube 3 will then conduct and direct current from battery 13 will flow through the load 11. The increase in capacitance 17 between the sensing electrode 9 and ground may be caused by the touch of a finger as in the application described in the above-mentioned patent, or by the immersion of the sensing electrode 9 in a fluid or powdery material.

In the circuit of Figure 1 the tube 3 will remain ionized (i.e. conducting) after the increased capacitance between the sensing electrode 9 and ground has been removed. The above-mentioned U.S. patent suggests that if battery 13 is replaced by an alternating current source, the tube 3 will remain conductive only as long as the increased capacitance between the sensing electrode 9 and ground is present. This suggested modification of the circuit of Figure 1 has the disadvantage that a small amount of pulsating current will then flow through the load 11 while the increased capacitance 17 is present. If load 11 is a relay, this small amount of pulsing current may be insufficient to hold the relay in the position indicating the presence of an increased capacitance between the sensing electrode 9 and ground.

Reference will now be made to the circuit shown in Figure 2, in which the same reference numerals have been used to indicate circuit elements which are similar to those of the circuit of Figure 1. The tube 3 is connected in series with the relay 11 across a source of D.-C. potential taken from the B+ terminal 19 and the tap 21 on potentiometer 23. A relaxation oscillator 25 comprising gas tube 27, capacitor 29 and resistor 31 is connected in parallel with the relay 11. This relaxation oscillator 25 applies short negative pulses through the relay 11 in a manner which will be described more fully below. The sensing electrode 9 terminates into a probe which is positioned inside a tank 33. Insulated spacers 35 insulate the sensing electrode 9 from the walls of the tank 33 which is grounded. The relay 11 operates an output device 37 which may be a pump supplying fluid to the tank 33. The operative connection between the output device 37 and the tank 33 is shown by means of broken line 39.

Figure 2:
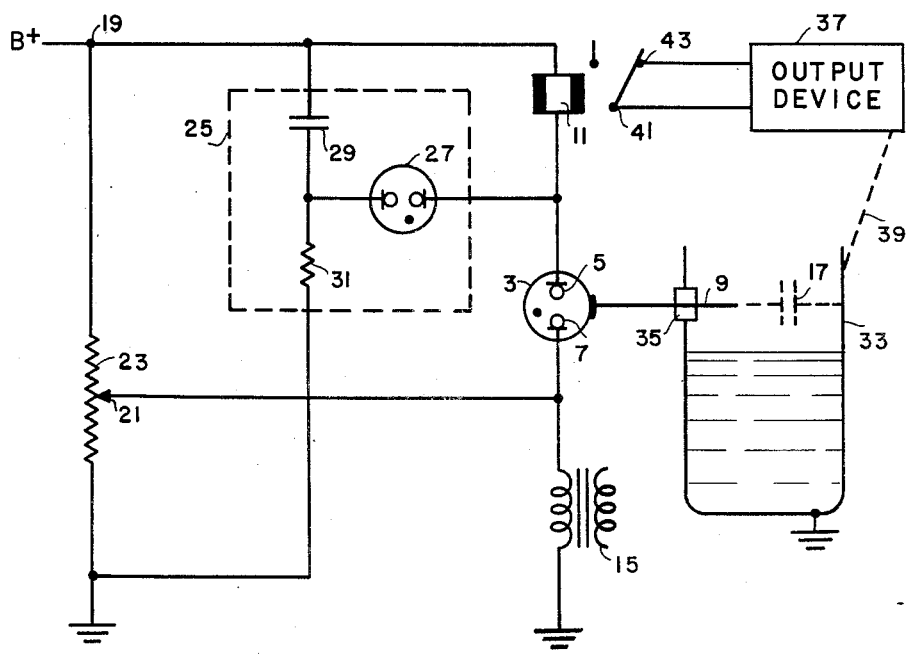
Figure 2 is a schematic diagram of a control circuit in accordance with the present invention.

The operation of the circuit of Figure 2 is as follows: the D.-C. voltage supplied across B+ supply terminal 19 and tap 21 is less than the voltage required to break down the gas between the internal electrodes 5 and 7 of tube 3 and greater than that required to sustain ionization between the internal electrodes 5 and 7 of tube 3 after ionization has started. When the level of the fluid in tank 33 is below the level of the sensing electrode 9, the value of the capacitance 17 is low and there is therefore no appreciable amount and alternating current flowing between electrodes 7 and 9 of the tube 3. Tube 3, therefore, does not conduct. When the level of the fluid in tank 33 reaches that of the sensing electrode 9, the value of the capacitance is increased so that enough alternating current flows between electrodes 7 and 9 of the tube 3 to ionize the gas in tube 3. Tube 3 conducts and direct current flows through the tube 3 and the relay 11, opening the normally closed contacts 41 and 43 of the relay. The output device 37 stops pumping fluid into the tank 33.

What we have described, thus far, is similar to the operation of the circuit of Figure 1. The circuit of Figure 2, however, is provided with the relaxation oscillator 25 which operates as follows: the capacitor 29 charges through resistor 31 until the voltage across the gas tube 27 reaches its break-down voltage. When the gas tube 27 fires, capacitor 29 discharges and a short pulse of current flows from the B terminal 19 through relay 11, tube 27 and resistor 31 to ground. This short pulse of current results in a negative voltage pulse at the anode 5 of the gas tube 3. If tube 3 is conducting at the time, this short negative voltage pulse is sufficient to bring the voltage across tube 3 below the sustaining voltage of the tube and therefore to deionize the tube 3.

When the capacitor 29 is discharged, the gas tube 27 stops conducting, capacitor 29 starts charging again and the above cycle is repeated, resulting in periodically deionizing the gas tube 3 when it is conductive.

After the gas tube 3 is deionized by the action of the relaxation oscillator 25, it will re-ignite itself if the value of capacitance 17 is still high, i.e. if the level of the fluid in tank 33 is at or above that of the sensing electrode 9. If, on the other hand, the level of the fluid in tank 33 has dropped below that of the sensing electrode 9, the gas tube 3 will not re-ignite itself as the value of capacitance 17 will have dropped and there will not be sufficient alternating current flowing between electrodes 7 and 9 of tube 3 to cause re-ignition. No direct current will then flow through the relay 11, contacts 41 and 43 will close and the output device 37 will start pumping fluid into the tank 33.

The short pulse of current due to the oscillator 25 goes through the relay 11 in the same direction as the current flowing through the gas tube 3. Thus, the pulse which causes the deionization of gas tube 3 acts to hold the contacts of relay 11 in place until gas tube 3 re-ignites.

I claim:

An electrical control circuit comprising a gas-filled tube having two internal electrodes and one external electrode, a relay, means to connect the two internal electrodes of said gas tube and said relay to form a series circuit, means to connect said series circuit across a source of unilateral potential the magnitude of which is less than the voltage required to break down the gas between the internal electrodes of the tube and greater than that required to sustain ionization between said internal electrodes of the tube after ionization has started, means for applying an alternating potential between an internal electrode and the external electrode for initiating gaseous ionization within the tube, and means for perodically deionizing the gas within the tube, said last-named means comprising an oscillator including a capacitor connected in parallel with said relay and discharging pulses of current and means to apply said pulses of current through the relay in the same direction as the direct-current which flows through the relay when the gas tube is ignited, said current pulses causing across said relay an increased voltage drop of sufficient magnitude to deionize said gas tube.

References Cited in the file of this patent

UNITED STATES PATENTS

| | | |
|---|---|---|
| 1,597,760 | Burstyn | Aug. 31, 1926 |
| 2,020,917 | Stogoff | Nov. 12, 1935 |
| 2,049,647 | Geffcken et al. | Aug. 4, 1936 |
| 2,056,912 | Swart | Oct. 6, 1936 |
| 2,092,861 | Swart | Sept. 14, 1937 |
| 2,252,189 | Langer | Aug. 12, 1941 |
| 2,525,768 | Bruns | Oct. 17, 1950 |